United States Patent
Nishiuchi et al.

(10) Patent No.: US 7,160,570 B2
(45) Date of Patent: Jan. 9, 2007

(54) METHOD FOR MANUFACTURE OF HIGHLY CYSTEINE-CONTAINING FOOD MATERIAL

(75) Inventors: Hiroaki Nishiuchi, Kanagawa (JP); Yuki Nishimori, Kanagawa (JP); Yasushi Nishimura, Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 498 days.

(21) Appl. No.: 10/796,055

(22) Filed: Mar. 10, 2004

(65) Prior Publication Data

US 2004/0247771 A1    Dec. 9, 2004

(30) Foreign Application Priority Data

Mar. 10, 2003   (JP) .............................. 2003-062660

(51) Int. Cl.
C12P 13/12    (2006.01)
A23J 1/18     (2006.01)

(52) U.S. Cl. ..................... 426/655; 426/535; 435/113

(58) Field of Classification Search ................ 435/113; 426/60, 61, 62, 534, 535, 650, 655, 656, 426/520

See application file for complete search history.

(56) References Cited

FOREIGN PATENT DOCUMENTS

| EP | 1 142 493 | 10/2001 |
|---|---|---|
| EP | 1 283 015 | 2/2003 |

OTHER PUBLICATIONS

P. H. List, Wissenschaftliche Verlagsgesellschaft, XP-002286870, pp. 282-283, "Arzneiformellehre", 1985 (with English Abstract).

*Primary Examiner*—Keith Hendricks
(74) *Attorney, Agent, or Firm*—Oblon, Spivak, McClelland, Maier & Neustadt, P.C.

(57) ABSTRACT

The present invention relates to a method for the manufacture of a food material containing high quantities of cysteine. In this method, a yeast extract is prepared from yeast cells that contains γ-glutamylcysteine and the extract is concentrated by controlling the temperature to be not greater than 60° C. to prepare a food material in a liquid form, wherein the concentration of solids is at least 10% and the resulting food material is maintained at 70 to 130° C.

17 Claims, 13 Drawing Sheets

Fig. 1A Decomposition Reaction of 10 mM γ-GC
Changes in decomposition of γ-GC with a lapse of time
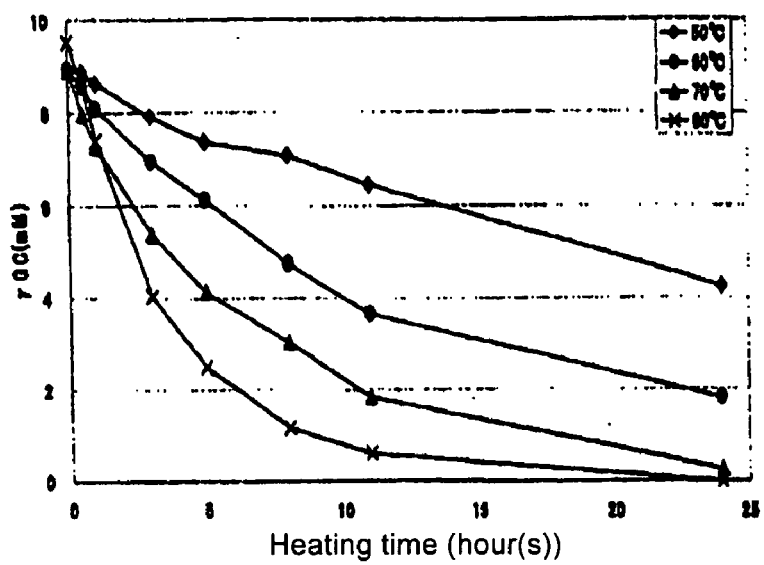
Arrhenius plots of decomposition of γ-GC
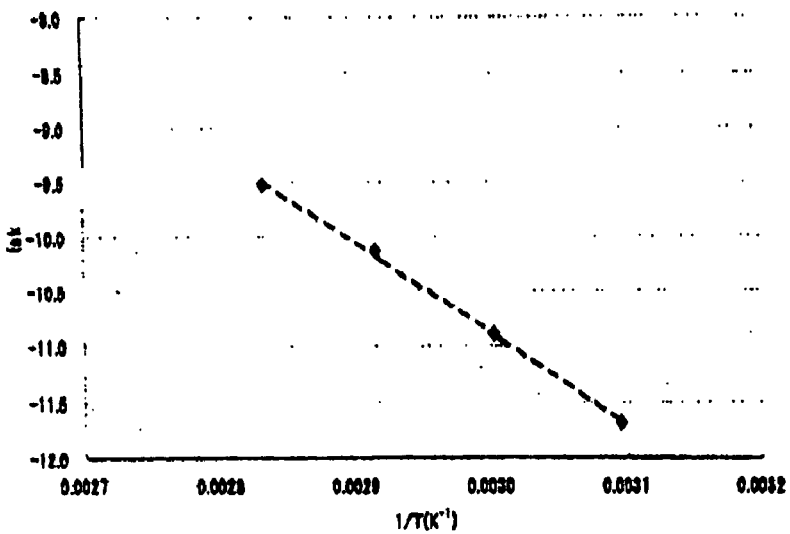

Fig. 1B Decomposition Reaction (Production of Cys) of 10 mM γ-GC
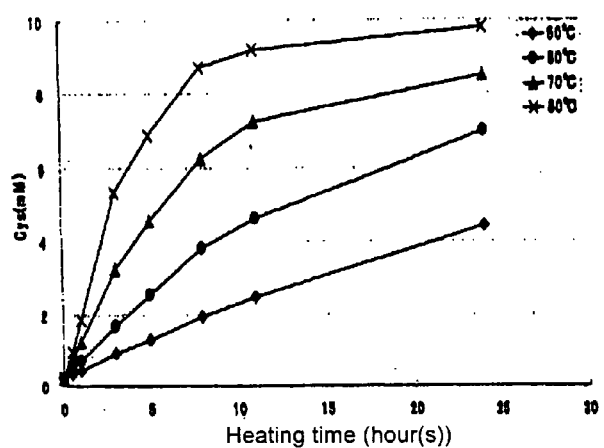
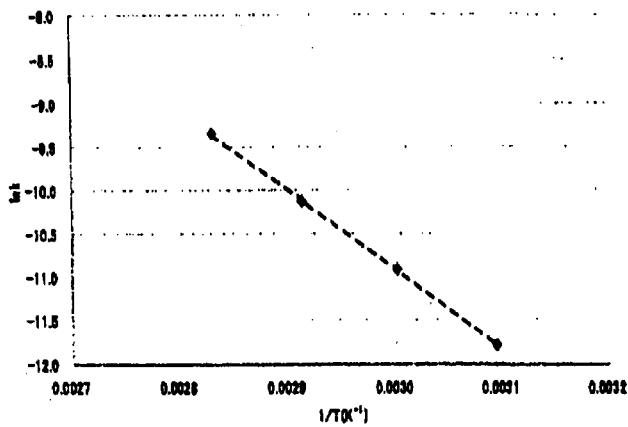

Fig. 1C Decomposition Reaction of 100 mM γ-GC
Changes in decomposition of γ-GC with a lapse of
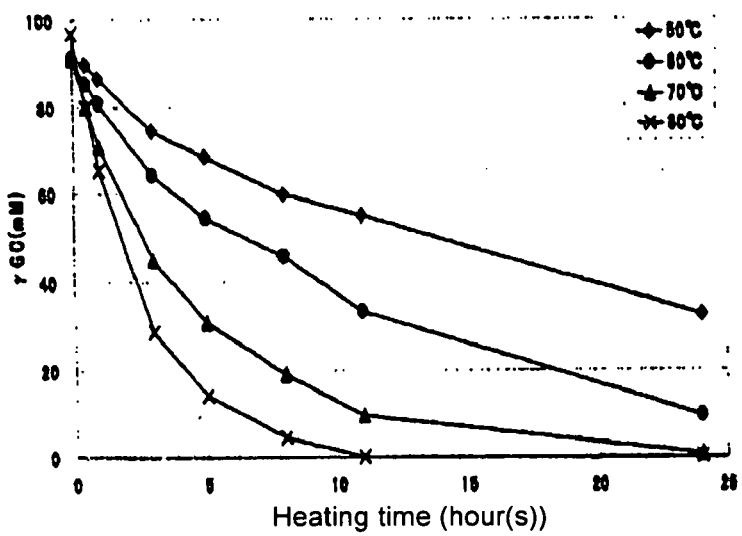
Arrhenius plots of decomposition of γ-GC
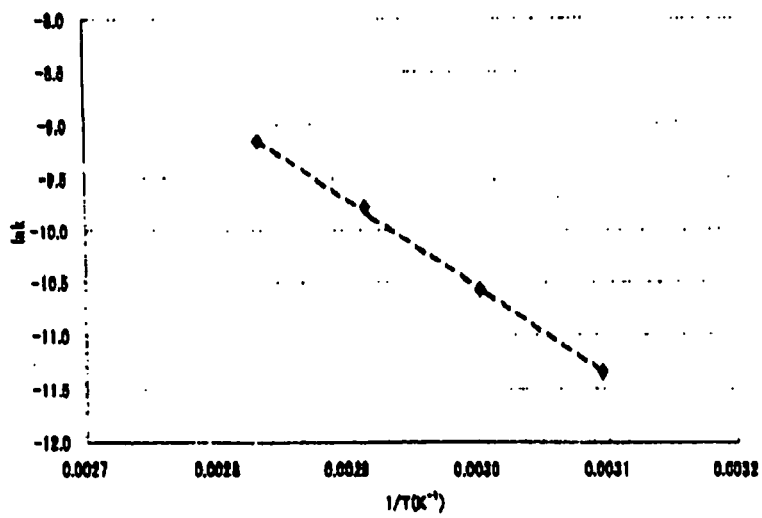

Fig. 1D Decomposition Reaction (Production of Cys) of 100 mM γ-GC
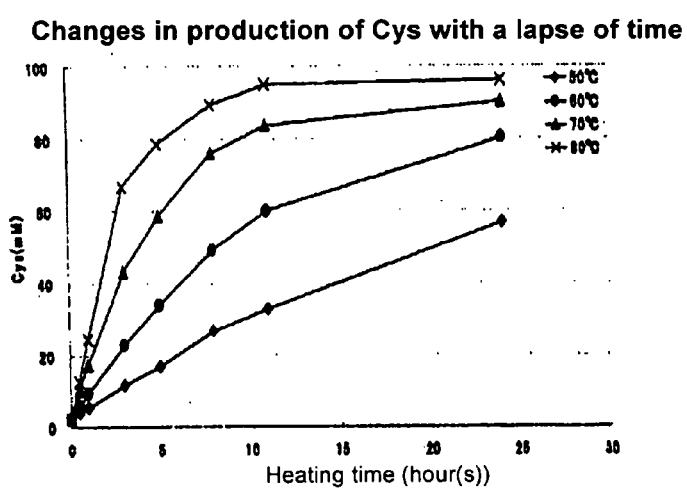
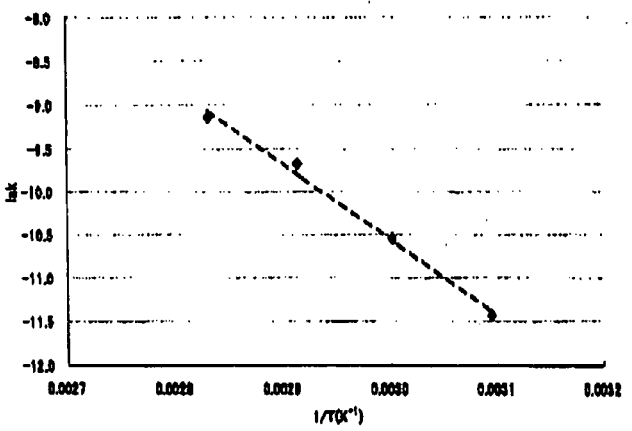

Fig. 3 Heating reaction in the coexistence and absence of GSSG
(a) Heating reaction in the coexistence of 10 mM GSSG
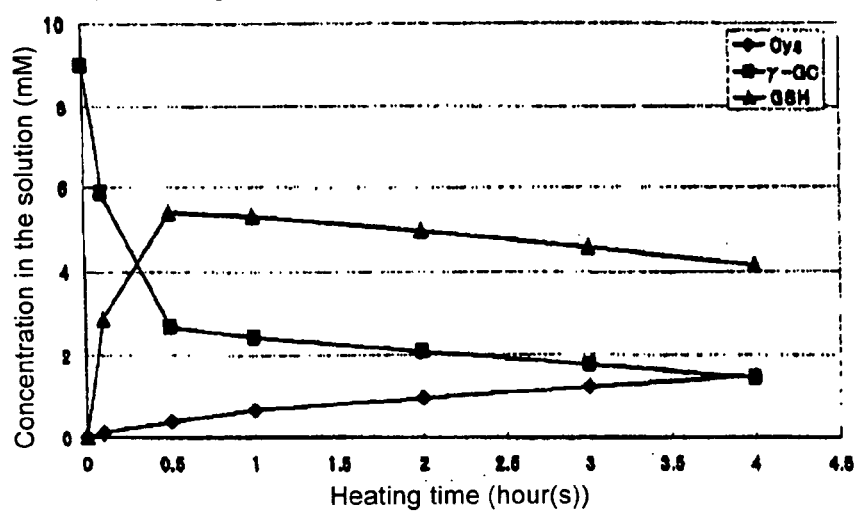
(b) Heating reaction in the absence of GSSG
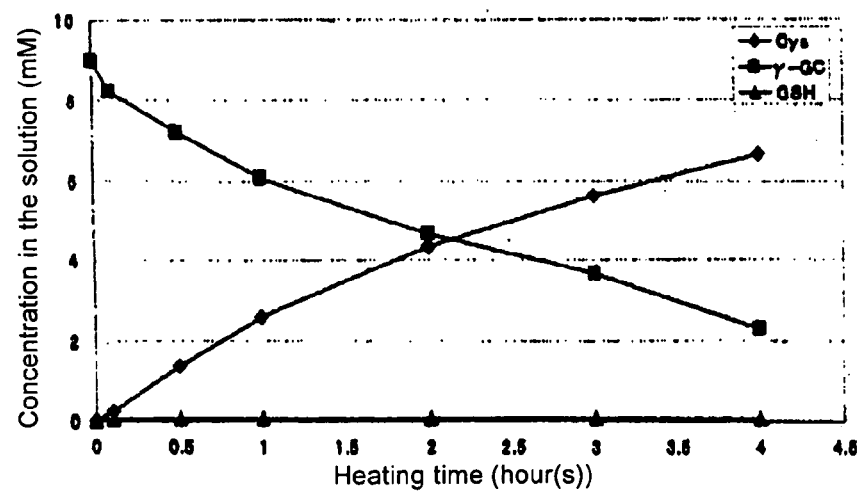

Fig. 4 Converting rate of Cys in the presence of a saccharide
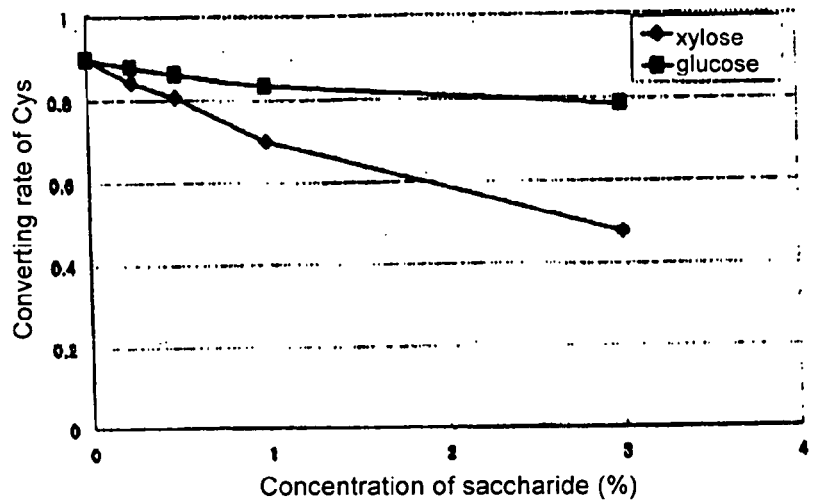
Fig. 5 Residual rate of γ-GC in the presence of dissolved oxygen
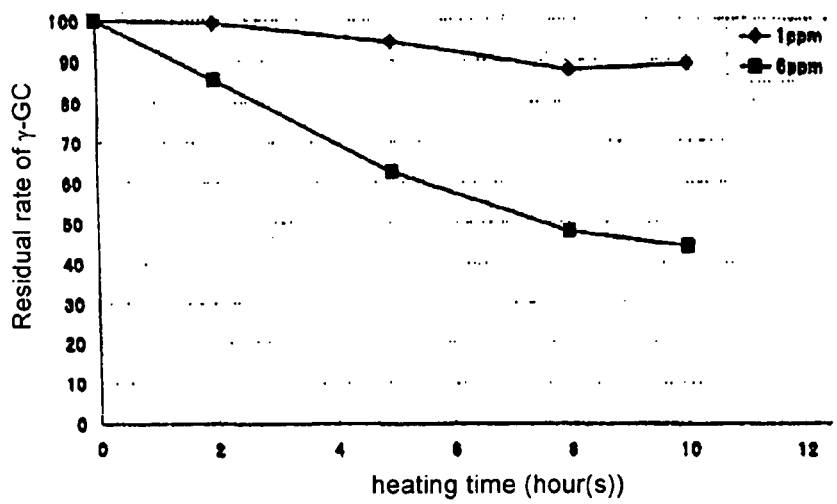

Fig. 6A Decomposition reaction of γ-GC in the case of 3% in DM
a) Changes in decomposition of γ-GC with a lapse of time in the case of 3% in DM
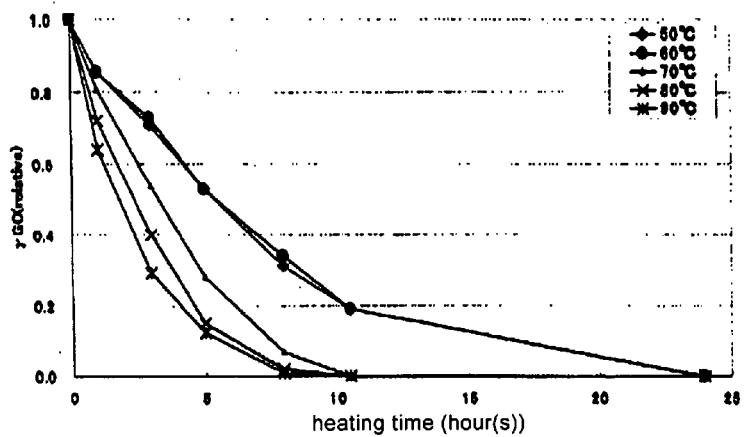
(b) Arrhenius plots in the case of 3% in DM
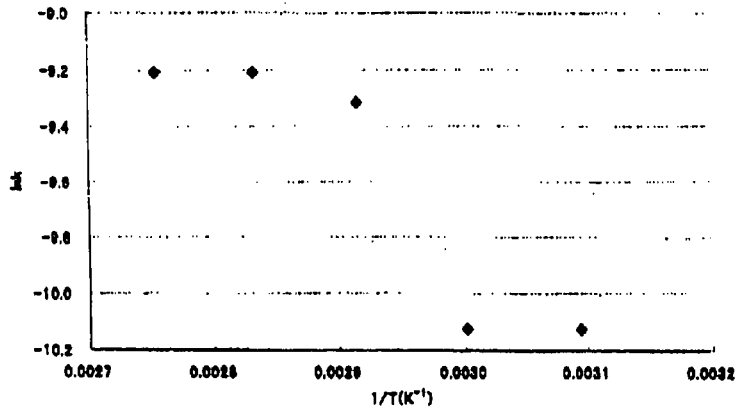

Fig. 6B Decomposition reaction of γ-GC in the case of 5% in DM
(a) Changes in decomposition of γ-GC with a lapse of time in the case of 5% in DM
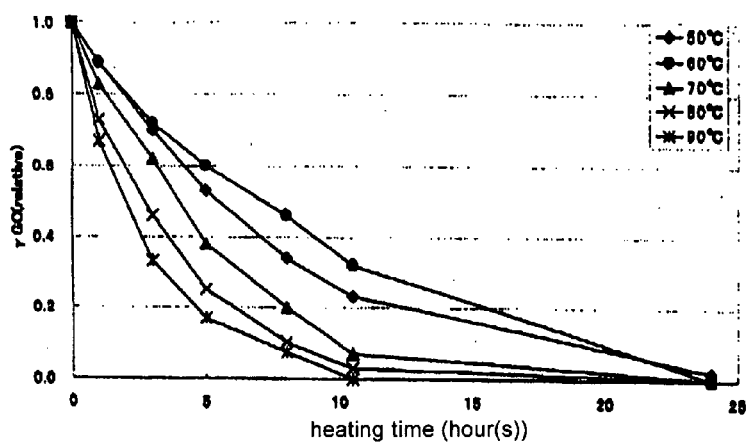
(b) Arrhenius plots in the case of 5% in DM
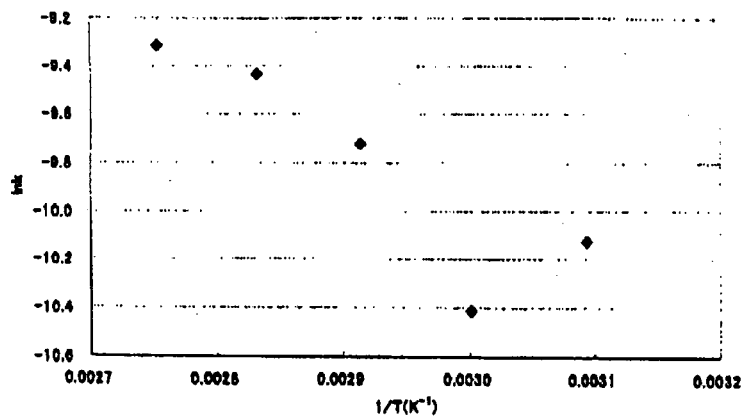

Fig. 6C Decomposition reaction of γ-GC in the case of 8% in DM
(a) Changes in decomposition of γ-GC with a lapse of time in the case of 8% in
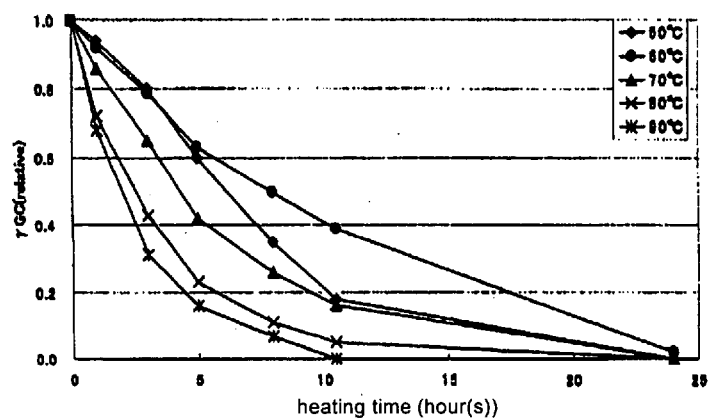
(b) Arrhenius plots in the case of 8% in DM
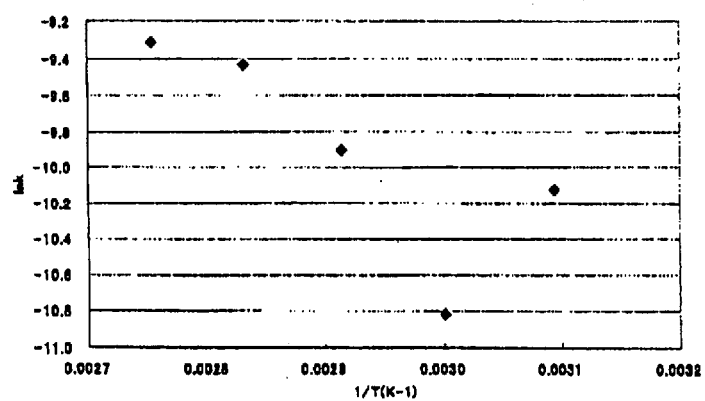

Fig. 6D Decomposition reaction of γ-GC in the case of 10% in DM
(a) Changes in decomposition of γ-GC with a lapse of time in the case of 10% in
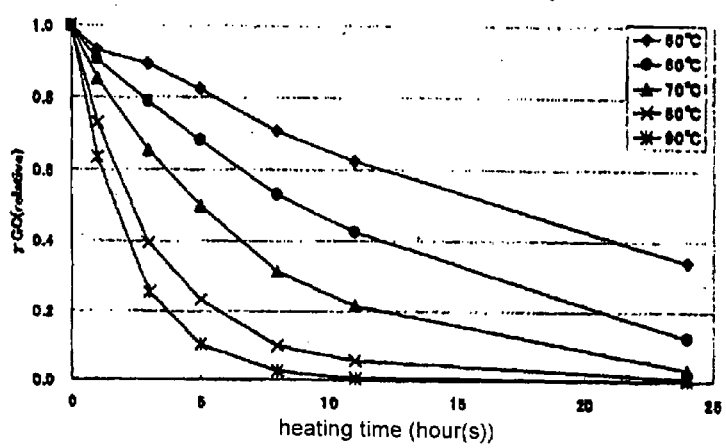
(b) Arrhenius plots in the case of 10% in DM
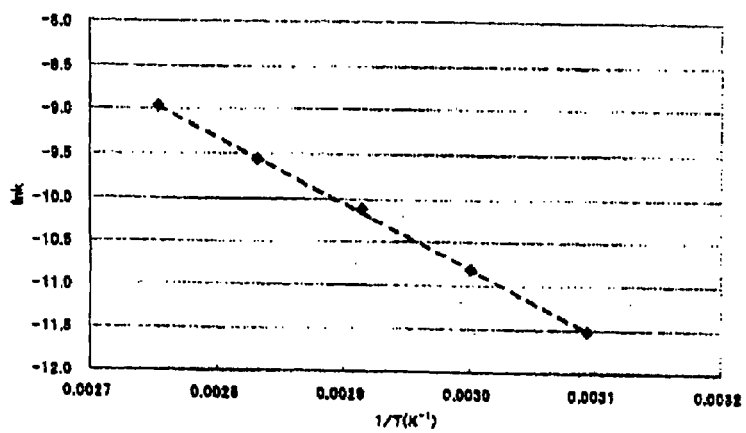

Fig. 6E Decomposition reaction of γ-GC in the case of 20% in DM
(a) Changes in decomposition of γ-GC with a lapse of time in the case of 20% in DM
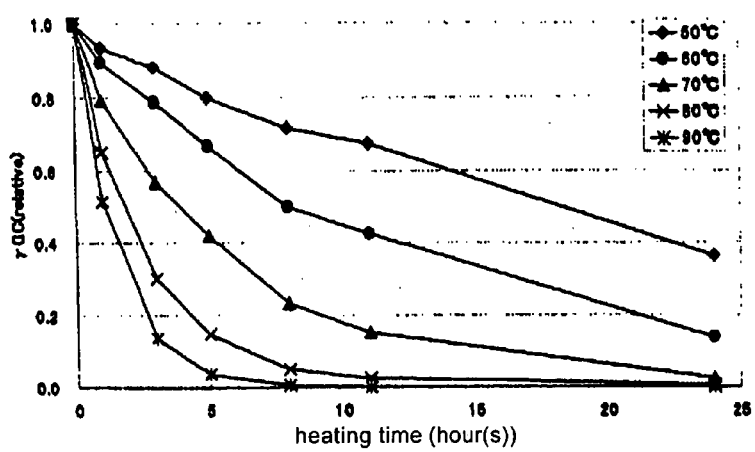
(b) Arrhenius plots in the case of 20% in DM
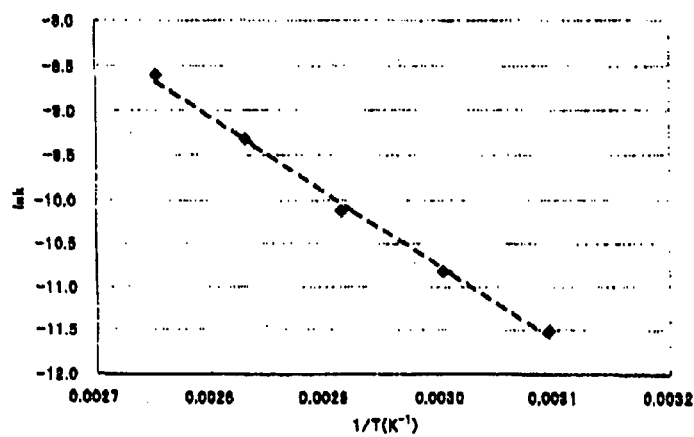

Fig. 6F Decomposition reaction of γ-GC in the case of 30% in DM
(a) Changes in decomposition of γ-GC with a lapse of time in the case of 30% in DM
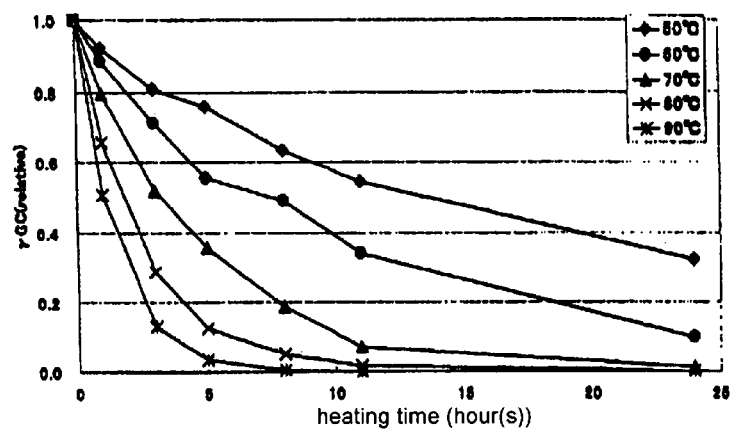
(b) Arrhenius plots in the case of 30% in DM
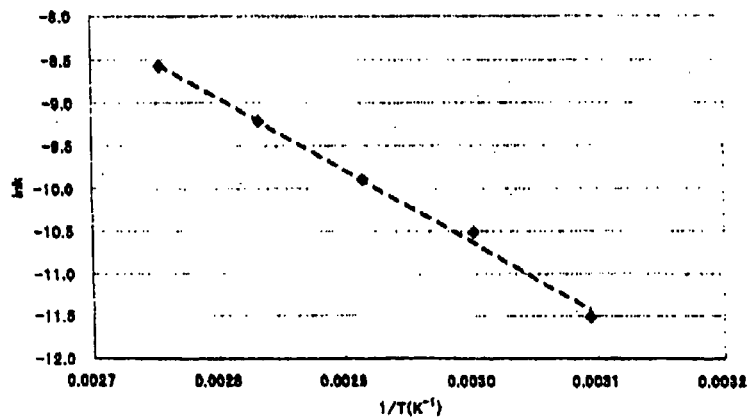

METHOD FOR MANUFACTURE OF HIGHLY CYSTEINE-CONTAINING FOOD MATERIAL

CROSS-REFERENCE TO RELATED APPLICATIONS

The present application claims priority to Japanese Application No. JP 2003-062660, filed on Mar. 10, 2003, which is hereby incorporated by reference in its entirety.

BACKGROUND OF THE INVENTION

1. Field of the Invention

The present invention relates to a method for the manufacture of a food material containing high quantities of cysteine. In this method, a yeast extract is prepared from yeast cells that contain γ-glutamylcysteine and the extract is concentrated by controlling the temperature to be not greater than 60° C. to prepare a food material in a liquid form, wherein the concentration of solids is at least 10% and the resulting food material is maintained at 70 to 130° C.

2. Discussion of the Background

Cysteine and cystine, which is a disulfide of the oxide-type of cysteine, are used to improve the taste of food. JP-A-10-136883 discloses a method where food is dipped into an electrolyte solution containing cysteine and cystine to suppress the color change of food to brown. JP-A-10-136883 also discloses that cystine is reduced to cysteine in a reduction electrode and that a brown dye, quinine, produced by an enzymatic oxidation is suppressed by cysteine. Therefore, to suppress discoloration of food by using cystine, a troublesome operation of production of cysteine by reduction is necessary.

Japanese Patent No. 3246064 discloses using cysteine for the manufacture of dried fish. According to that disclosure the dried fish, in which a sulfur-containing compound has been added in the manufacture of dried fish from material fish, taste is enhanced and deterioration of the taste is suppressed. In addition, the effect of addition of cysteine is greater per weight than for cystine.

International Publication WO 93/08274 discloses a cysteine residue prepared by reduction of cystine residue contained in animal and vegetable protein is added to improve bread dough. As such, cysteine has a broad usable range and is highly effective for use as a compared with cystine.

Methods for manufacturing cysteine by decomposition of protein and a semi-synthetic method are known and commonly used. For the use of cysteine to meet the above-mentioned object, there has been a strong demand for a food material that contains cysteine in a high concentration. However, almost no food material containing a high concentration of cysteine has been known up to now.

Based on WO 00/30474, when a food material containing γ-glutamylcysteine (hereinafter, may be abbreviated as γ-GC) is subjected to an enzymatic treatment or to a heating treatment under a specific condition, a food material containing high amounts of cysteine and cystine is produced. Although the total productivity of cysteine (hereinafter, may be referred to as Cys) and cystine from γ-GC is mentioned, the productivity of sole cysteine from γ-GC is not provided in WO 00/30474.

As previously stated, it has been known that cysteine has a broad use and is more effective compared to cystine. In addition, an efficient production method for cysteine would be useful in industry. Enzymatic manufacturing of cysteine and cystine require an enzyme and, as such, this process has a higher cost than a heat treatment manufacturing process.

In view of the foregoing, there remains a strong demand for an improved method where cysteine is efficiently manufactured from γ-GC by a heat treatment.

Japanese Patent No. 283041 and Japanese Patent No. 2903659 attempt to satisfy this demand by providing a heat treatment process. JP 2830415 discloses that addition of a saccharide to γ-GC followed by heating results in a flavor composition having good taste and flavor like roast meat. JP 2903659 discloses that, addition of a saccharide to a yeast extract containing a certain amount of sulfur-containing compound, such as glutamylcysteine, followed by heating in the absence of fat results in a seasoning having a taste of roast meat flavor. However, Japanese Patent No. 283041 and Japanese Patent No. 2903659 do not disclose or suggest that cysteine may be efficiently prepared from γ-GC.

SUMMARY OF THE INVENTION

It is an object of the present invention to provide a method where cysteine is efficiently produced from γ-GC.

It is also an object of the preset invention to provide a method for the manufacture of a high cysteine-containing food material from yeast extract.

The above objects highlight certain aspects of the invention. Additional objects, aspects and embodiments of the invention are found in the following detailed description of the invention.

BRIEF DESCRIPTION OF THE FIGURES

A more complete appreciation of the invention and many of the attendant advantages thereof will be readily obtained as the same becomes better understood by reference to the following Figures in conjunction with the detailed description below.

FIG. 1A shows a decomposition reaction of γ-GC (concentration: 10 mM) (Experimental Example 1).

FIG. 1B shows a decomposition reaction (production of Cys) of γ-GC (concentration: 10 mM) (Experimental Example 1).

FIG. 1C shows a decomposition reaction of γ-GC (concentration: 100 mM) (Experimental Example 1).

FIG. 1D shows a decomposition reaction (production of Cys) of γ-GC (concentration: 100 mM) (Experimental Example 1).

FIG. 3 shows a heating reaction of Cys, γ-GC and GSH in the coexistence of and in the absence of GSSG (Experimental Example 2).

FIG. 4 shows a decomposition reaction of γ-GC (converting rate of Cys) in the presence of a saccharide (Experimental Example 5).

FIG. 5 shows a relation between the dissolved oxygen concentration and the residual rate of γ-GC (Experimental Example 6).

FIG. 6A shows a decomposition reaction of γ-GC in the case of 3% in DM (Experimental Example 7).

FIG. 6B shows a decomposition reaction of γ-GC in the case of 5% in DM (Experimental Example 7).

FIG. 6C shows a decomposition reaction of γ-GC in the case of 8% in DM (Experimental Example 7).

FIG. 6D shows a decomposition reaction of γ-GC in the case of 10% in DM (Experimental Example 7).

FIG. 6E shows a decomposition reaction of γ-GC in the case of 20% in DM (Experimental Example 7).

FIG. 6F shows a decomposition reaction of γ-GC in the case of 30% in DM (Experimental Example 7).

DETAILED DESCRIPTION OF THE INVENTION

Figure 2:
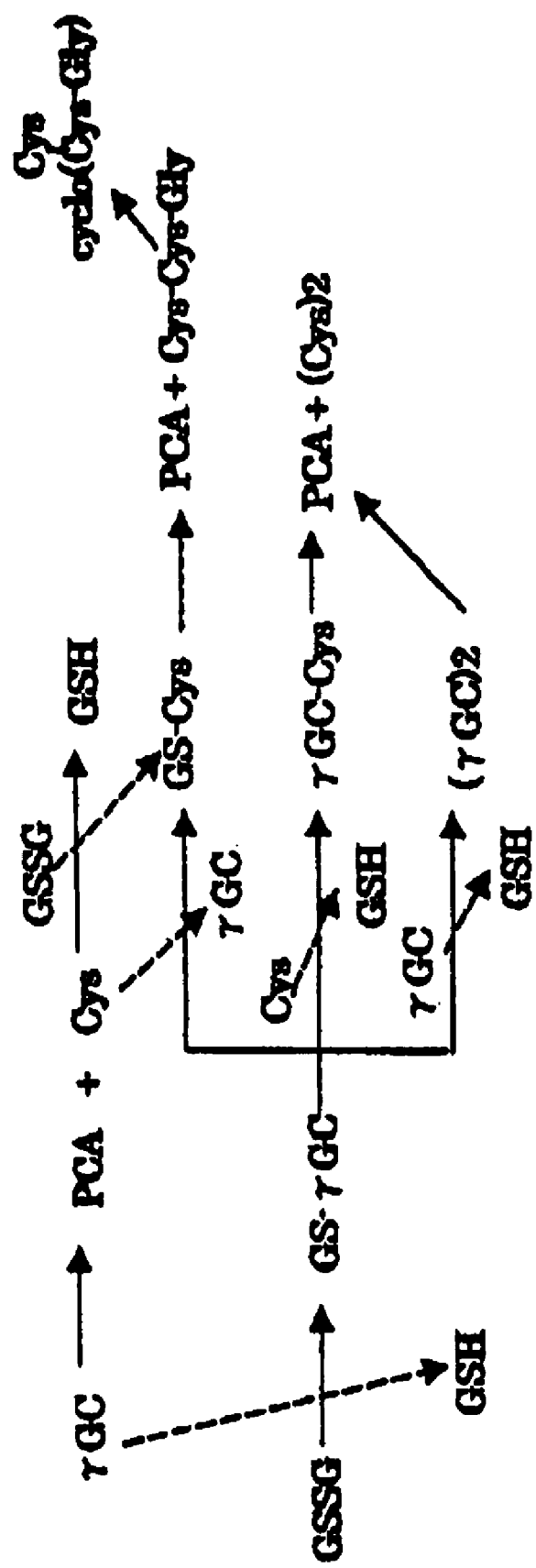
FIG. 2 shows a mechanism of interaction of γ-GC with a sulfur-containing compound of an oxide type (Experimental Example 2).

Unless specifically defined, all technical and scientific terms used herein have the same meaning as commonly understood by a skilled artisan in biochemistry, cellular biology, molecular biology, and the medical sciences.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

WO 00/30474 discloses that heating of γ-GC provides a high yield in the total amount of cysteine and cystine.

The present invention is based, in part, on the inventor's discovery that the reaction of γ-GC with heating proceeds as an intramolecular reaction (see Experimental Example 1). In view thereof, the yield of cysteine and cystine liberated from γ-GC by a thermal decomposition is not dependent on the concentration of γ-GC. Accordingly, it is not necessary to concentrate an aqueous solution containing γ-GC.

On the other hand, sulfur-containing compounds are abundantly contained in yeast extract and interact with γ-GC (see Experimental Example 2). Therefore, when γ-GC thermally decomposed in a solution of a food material such as a yeast extract containing sulfur-containing compounds, it is presumed that an intermolecular reaction, which is characteristic to the reaction of two or more molecules, occurs. Accordingly, a process where γ-GC is thermally decomposed in a solution of a food material, such as yeast extract, has a reaction mechanism where intramolecular reaction and intermolecular reaction compete.

When an intramolecular reaction and an intermolecular reaction compete as such, the intermolecular reaction may be suppressed by lowering the concentration of reactant in the reaction solution. On the other hand, the intramolecular reaction itself is not dependent on the concentration of a substrate and, therefore, even if the concentration of the reactant in the reaction solution is reduced the reaction rate is not affected. Consequently, the intermolecular reaction is suppressed when the concentration of the reactant in the reaction solution is lowered and, as a result, efficiency of the intramolecular reaction increases relatively.

A cyclization reaction of peptide is an example of the reaction where intermolecular reactions and intramolecular reactions compete. When a cyclic peptide is synthesized, priority is given to an intramolecular cyclization (intramolecular reaction) and, therefore, the reaction is performed at a high dilution. Alternatively, the reaction is performed by a dropping a solution of reactant into a solution whereby the concentration of the reactant in the reaction solution is reduced and the cyclic peptide is synthesized in a high yield.

Under this theoretical background, in a thermal decomposition of γ-GC in a solution of a food material such as yeast extract, conducting the reaction at a low concentration of solids of food materials contributes to improving the productivity of cysteine and cystine from γ-GC. WO 00/30474 discloses that when thermal decomposition was carried out after dissolving of yeast extract powder containing 4.5% of γ-GC so as to make the concentration of the solid 2% in the resulting aqueous solution, a yeast extract powder containing 2% as a whole of cysteine and cystine was obtained (refer to Example 1 of the Document). Productivity of cysteine and cystine from γ-GC at that time is not less than 90% showing a very high productivity as the above-mentioned theory.

As compared with cystine, cysteine has a broad use and a high effectiveness, therefore, it is necessary to confirm the productivity of cysteine (conversion rate to cysteine) under the condition mentioned in WO 00/30474. Therefore, the present inventors made the yeast extract powder containing γ-GC into an aqueous solution containing 2% solid concentration in accordance with Example 1 of WO 00/30474, performed a thermal treatment under the same condition and determined the conversion rate to cysteine (i.e., quotient of molar numbers of cysteine in the thermally treated aqueous solution divided by molar numbers of γ-GC in the aqueous solution before the thermal treatment) whereupon the conversion rate from γ-GC to cysteine was about 40%.

In order to increase the conversion rate of γ-GC to cysteine, the present inventors have performed an intensive investigation and, as a result, they have found that the conversion rate from γ-GC to cysteine could be raised to as high as 70% when the yeast extract containing γ-GC is concentrated while maintaining the temperature at not greater than 60° C. to provide a concentrate having at least 10% of solid and subsequently subjecting the extract to heat treatment at 70 to 130° C. Preferably, the extract is in a state of an aqueous solution where the existing amount of a reducing sugar is not more than 1%, preferably under an acidic condition or more preferably at pH 3.5 to 6. On the basis of such a finding, the present invention has been achieved. Such a result is an unexpected one which is different from the result presumed from the decomposition reaction in an aqueous solution of γ-GC where intramolecular reaction and intermolecular reaction compete.

Thus, the present invention relates to a method for an efficient manufacture of a food material containing a high amount of cysteine from yeast extract containing γ-GC, which comprises such steps that a yeast extract prepared by a treatment of yeast cells is concentrated at a temperature of not greater than 60° C. to provide a concentrate having a solid concentration of at least 10% and then maintaining the concentrate at a temperature ranging from 70 to 130° C., which is higher than the above-mentioned concentrating temperature (heating treatment), preferably 70 to 100° C. or, more preferably, 75 to 100° C. preferably under an acidic condition or, more preferably, at pH 3.5 to 6.0 and, preferably, in the presence of a low amount or, to be specific, preferably not more than 1% or, more preferably, not more than 0.5% of reducing sugar.

The present invention will now be illustrated in detail as hereunder.

(1) Firstly, yeast containing γ-GC is able to be obtained as follows.

There is no particular limitation for the yeast to be used in the present invention so far as it is a yeast containing γ-GC. It is preferable to use a yeast containing not less than 1% by weight of γ-GC (weight of γ-GC per dried cell weight) since a food material, prepared from yeast containing less than 1% by weight of γ-GC, possess a yeasty smell and/or flavor in order that the material can contain high Cys content. The maximum weight of γ-GC contained by a yeast (weight of γ-GC per dried cell weight) should not exceed 30% since γ-GC localizes at soluble part of yeast cell and nearly ⅓ weight of yeast cell is soluble part. Examples of such a yeast are an H4ΔGSH2 strain mentioned in the International Publication WO 00/30474 and Nα2 strain and Nα3 strain mentioned in the International Publication 01/90310.

As will be mentioned later, γ-GC interacts with a compound having an SH group in the yeast extract during the decomposition reaction whereupon the productivity of cysteine lowers and, therefore, it is preferred to use a yeast where the glutathione content in the cells is low, preferably not more than 0.5% in dried yeast cells or, more preferably, not more than 0.1% or still more and preferably to use a strain containing only few amount of glutathione in view of a balance to the growth of the cells. Examples of such a strain are *Saccharomyces cerevisiae* having a glutathione-synthesizing enzyme where a glycine residue at the position 387 is mutated to an aspartic acid residue, *Saccharomyces cerevisiae* having a glutathione-synthesizing enzyme where a proline residue at the position 54 is mutated to a leucine residue and *Saccharomyces cerevisiae* having a glutathione-synthesizing enzyme where an arginine residue at the position 370 and thereafter are deficient.

As previously mentioned, there is no particular limitation for a yeast strain so far as it is a yeast strain containing γ-GC and specific examples are yeast strains belonging to genus *Saccharomyces* such as *Saccharomyces cerevisiae*, genus *Schizosaccharomyces* such as *Schizosaccharomyces pombe* and genus *Candida* such as *Candida utilis*. Incidentally, in Example 1 which will be mentioned later, a diploid yeast (*Saccharomyces cerevisiae*) N3 strain prepared by utilizing a means mentioned in the International Publication WO 01/90310 where glutathione-synthesizing enzymatic activity was weakened was used.

(2) Then a method for the manufacture of yeast extract from the yeast prepared as above will be illustrated.

The cultured product of yeast prepared as above by incubation of seed yeast under a preferred condition contains yeast cells containing a predetermined amount of γ-GC. Although it is possible to manufacture a yeast extract directly from the culture product, it goes without saying that a yeast extract is also able to be manufactured from yeast cells containing γ-GC which are once separated from the cultured product of yeast. There is no particular limitation for the method of manufacturing the yeast extract but a common method may be used so far as the condition used does not significantly decompose γ-GC or Cys. An example is that the yeast cells are retained with hot water of 60 to 80° C. so that the content is extracted and the residue after extraction (cell residue) is removed.

When yeast extract is manufactured by an extracting method with hot water, the concentration of the solid in the yeast extract is usually about several percents. When the yeast extract is manufactured by means of extraction with hot water, cell residue is removed and, therefore, amount of γ-GC per solid contained in the yeast extract rises to an extent of several times. For example, when the content is extracted from yeast cells containing 1% by weight of γ-GC with hot water, content of γ-GC per solid contained in the yeast extract rises to about 4 to 8% by weight. Incidentally, although the extracting efficiency is inferior, a method for the manufacture of a yeast extract from yeast cells or cultured yeast where the extracting temperature is kept as low as not higher than 60° C. is not excluded from the embodiment of the present invention as well. In that case, it directly continues to the concentrating step which is the next step and, therefore, the temperature is continuously kept at not higher than 60° C. until the solid concentration in the yeast extract which is an extract reaches 10% or more.

(3) Method of concentration of the above-prepared yeast extract according to the method of the present invention is as follows.

Thus, since the solid concentration of the yeast extract manufactured as mentioned above is usually as low as several percents, it is necessary to concentrate before the heating treatment for conversion of γ-GC to Cys. There is no particular limitation for the concentrating method so far as γ-GC and Cys are not significantly decomposed although a low-temperature concentration is preferred. Concentration under a high-temperature condition is not preferred because γ-GC and Cys interact with a sulfur-containing compound in the yeast extract whereupon the yield of Cys lowers.

Thus, in the present invention, yeast extract is concentrated together with controlling to a low temperature of not higher than 60° C. to prepare a food material in a liquid form where the solid concentration is not less than 10%. Specific examples of the concentrating method at low temperature are vacuum concentration and freezing concentration. It is preferred that the concentration is carried out in the coexistence of few amount of dissolved oxygen such as not more than 3 ppm, preferably not more than 2 ppm or, more preferably, not more than 1 ppm of dissolved oxygen. Concentration in the coexistence of dissolved oxygen is not preferred because SH groups of Cys and γ-GC are oxidized whereupon the yield of Cys lowers. According to a low-temperature concentration under such a condition, concentration of the solid in the yeast extract becomes not less than 10% within, for example, 6 to 15 hours. In that case, it is also possible that the yeast extract becomes solid but, when made into solid, it is necessary to return the solid to a liquid using water or the like in the next heating reaction after the concentration. Accordingly, it is preferred in view of a process control that the yeast extract be in a liquid form after concentration.

(4) Then a method where the food material in a liquid form prepared as above is subjected to a heating treatment to give a food material containing high amount of cysteine will be illustrated.

It is preferred that the heating reaction (thermal decomposition) of the yeast extract after concentration is carried out in a food material (an aqueous solution) in a liquid form where solid concentration is not less than 10%. When the thermal decomposition is carried out in an aqueous solution where the solid concentration is less than 10%, the decomposition reaction of γ-GC does not follow a first-order reaction, a side reaction other than decomposition into Cys takes place and productivity of Cys lowers whereby that is not preferred. It is preferred in view of an efficient production of Cys that the heating temperature is between 70 and 130° C. When the heating reaction is carried out at lower than 70° C., some time is needed for the decomposition reaction of γ-GC to Cys and, during that period, SH groups of Cys and γ-GC are oxidized by oxygen dissolved in the solution whereby that is not preferred. On the other hand, when the decomposition reaction is carried out at higher than 130° C., SH groups of Cys and γ-GC are oxidized to lower the productivity of Cys whereby that is not preferred as well. According to the heating treatment under such a condition, the food material becomes a highly Cys-containing food material where Cys is contained in an amount of as high as 2% in the solid concentration within, for example, 30 to 120 minutes.

(a) Incidentally, the existing amount of the reducing sugar in the food material of a liquid state upon the heating treatment illustrated in the above (4) is as follows.

It is preferred that no reducing sugar is present during the thermal decomposition of γ-GC. To be specific, it is preferably not more than 1% and, more preferably, not more than 0.5% as illustrated previously. That is because, when a reducing sugar is present, it reacts with γ-GC and Cys and is converted to a substance other than Cys. Since the existing amount of the reducing sugar affects the converting rate to Cys, it is preferred to be absent if at all possible. Such a food material where the existing amount of reducing sugar is within the above range is able to be prepared from a cultured product of yeast in which a saccharide is assimilated to yeast so as to make the residual saccharide as little as possible in the culture of yeast. When the residual saccharide is in much amount, yeast extract is not directly manufactured from the cultured yeast but yeast cells are once separated from the cultured yeast or, if necessary, the yeast cells which are once separated are washed with water, etc. whereupon the yeast extract is able to be prepared. When a reducing sugar is present during the heating reaction (thermal decomposition) from γ-GC to Cys, it is preferred to conduct the conversion reaction from γ-GC to Cys where the existing amount of the reducing sugar is preferably not more than 1% or, more preferably, not more than 0.5% and under an acidic condition which is preferably pH 3.5 to 6 when molar equivalent, etc. are taken into consideration.

(b) The pH during the heating reaction is as follows.

As mentioned in Experimental Example 1 which will be shown later, the converting step of γ-GC to Cys by heating takes place in such a manner that protonation occurs at the site of oxygen atom of carbonyl group of γ-GC and, as a result, an elimination takes place where that site is a starting point. Therefore, it is preferred to be carried out under an acidic condition. For example, it may be pH 3.5 to 6 where a sufficient protonation is resulted.

As used above, the phrases "selected from the group consisting of," "chosen from," and the like include mixtures of the specified materials.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Having generally described this invention, a further understanding can be obtained by reference to certain specific examples, which are provided herein for purposes of illustration only, and are not intended to be limiting unless otherwise specified.

EXAMPLES

Experimental Example 1

Confirmation that a liberation reaction of cysteine from γ-GC is due to an intramolecular reaction When a structure optimization calculation for γ-GC was performed using an MOPAC (Cambridge Soft ChemOffice Ultra, CS MOPAC), it was predicted that the molecular structure of γ-GC was not an extended structure that is noted in dipeptides where common α-bond occurs. Instead the molecular structure of γ-GC, was a curved structure as if a γ-glutamyl group comes closer to an amino group (amido bond) of cysteine (Cys). When the polarization charge of γ-GC was calculated, there was negative charge at the site of oxygen atom of a carbonyl group at γ-position. Therefore, it is predicted that, under an acidic condition, protonation is apt to take place at this site of γ-GC and that elimination of the starting point of this site occurs whereupon Cys is liberated. From such a molecular structure of γ-GC, it is presumed that the liberation reaction of Cys from γ-GC (decomposition reaction of γ-GC to Cys) proceeds in accordance with an intramolecular reaction.

Subsequently, analysis by means of chemical kinetics was carried out in order to confirm that the liberation reaction of Cys from γ-GC proceeds by an intramolecular reaction and is not dependent on substrate concentration. Two kinds of aqueous solutions containing about 10 mM and about 100 mM of γ-GC were prepared, each was heated at 50, 60, 70 and 80° C. and the amounts of γ-GC after 0 to 24 hours was measured. The decomposition rate constant was calculated from the result and Arrhenius plots were prepared.

The results are shown in FIG. 1A to FIG. 1D. From these results, it is noted that the higher the heating temperature, the higher the decomposition rate. This shows the liberation reaction of Cys from γ-GC proceeds in a manner that is not dependent on the substrate concentration, but rather on the temperature.

From the results above, it has been confirmed that the liberation reaction of Cys from γ-GC takes placed by an intramolecular reaction and is not dependent on the substrate concentration of γ-GC.

Experimental Example 2

Interaction of γ-GC with a sulfur-containing compound of an oxide type

γ-GC interacts with other sulfur-containing compounds in the food material. Thus, the decomposition reaction of γ-GC in a solution containing glutathione of an oxide type that is a disulfide of an oxide type was investigated. In view thereof, it is estimated that, in a food material where a sulfur-containing compound of an oxide type coexists, γ-GC reduces the sulfur-containing compound of an oxide type due to its high reducing ability and, as such, the decomposition reaction of a compound containing γ-GC proceeds. It was presumed that the reaction proceeds according to the reaction mechanism shown in FIG. 2 as further discussed below.

Next, the reduction potentials of Cys, γ-GC and glutathione (hereinafter, may be abbreviated as GSH) were investigated and it was determined that the reducing ability was high in the order of Cys, γ-GC and GSH. Then, aqueous solutions (pH 5) were prepared containing 10 mM of γ-GC and, with or without, 10 mM of GSSG (glutathione of an oxidized type) and subsequently heated at 90° C. to measure the amounts of Cys, γ-GC and GSH as a function of time.

The results are shown in FIG. 3(a) and FIG. 3(b). From these results, it was determined that GSSG was reduced by γ-GC to produce GSH and, as a result of production of GS-γ-GC, liberation of Cys from γ-GC did not efficiently occur. Thus, when γ-GC was subjected to a thermal decomposition in a food material containing SH of an oxide type, a side reaction took place depending upon its concentration whereupon productivity of cysteine was diminished.

Experimental Example 3

Preparation of γ-GC-containing yeast extract and yeast extract powder

γ-GC-containing yeast extract powder used in the following Experimental Examples was prepared as follows.

(a) Preparation of γ-GC-Containing Yeast N3 Strain

Monoploid Na strain (MAT a) was prepared by a conventional method from a wild strain of diploid *Saccharomyces cerevisiae*. The Na strain and a monoploid yeast (*Saccharomyces cerevisiae*) Nα 3 strain (MATα gsh2) mentioned in the International Publication WO 01/9310 were conjugated to prepare a diploid yeast. The diploid yeast was subjected to a spore formation according to a conventional method and a monoploid yeast Na 3 strain (MATa gsh2) having a glutathione-synthesizing enzyme gene of a mutant type which was the same as Nα 3 strain was prepared.

The Nα 3 strain was conjugated to the Na 3 strain and, from the resulting diploid, a diploid yeast N3 strain was selected having a glutathione-synthesizing enzyme of a mutant type in homo form and containing at least 1% by weight of γ-GC during a logarithmic growth phase cultured in an SD medium. Incidentally, *Saccharomyces cerevisiae* FERM P-18546 (International Deposit No. BP-8228) could also be prepared instead of the Nα 3 strain. Moreover it was also able to use a diploid strain *Saccharomyces cerevisiae* AJ14861 (International Deposit FERM BP-08553) instead of the yeast N3 strain.

(b) Preparation of γ-GC-Containing Yeast Cells

The N3 strain, prepared as described above, was cultured using ajar fermenter. This strain was incubated in YPD medium by feeding glucose at 30° C. The cultured product was collected and washed to prepare the γ-GC-containing yeast cells.

(c) Preparation of γ-GC-Containing Yeast Extract and Yeast Extract Powder

The γ-GC-containing yeast cells prepared as described above were suspended in water to a concentration of 10 g/dl and heated at 70° C. for 10 minutes to extract the content. The yeast cell residue and content were separated by centrifugal separation. The separated content (yeast extract; solid concentration: 1.7%) was freeze-dried to prepare a yeast extract powder containing γ-GC in an amount of 8% to a DM (dry matter).

Experimental Example 4

Decomposition reaction of γ-GC in the presence of a saccharide (1)

WO 00/30474 and JP 2830415 disclose the preparation of a flavor composition having a good roast beef taste by addition of a saccharide to γ-GC in a yeast extract followed by heating. Now, productivity of Cys in that reaction was measured.

To this end, an aqueous solution of 83% concentration containing in a ratio of 30 parts by weight of the yeast extract powder prepared in Experimental Example 3, 30 parts by weight of glutamic acid and 3 parts by weight of xylose (reducing sugar) was prepared (existing amount of the reducing sugar: 3%). This aqueous solution was heat treated at 90° C. for 35 minutes. No Cys was produced by this heat treatment. That is presumed to be due to the fact that the resulting Cys reacted with the saccharide.

Experimental Example 5

Decomposition reaction of γ-GC in the presence of a saccharide (2)

A stock aqueous solution (pH 4.5) was prepared containing a final concentration of 30% of the yeast extract powder obtained in Experimental Example 3 and equally divided into ten aliquots. Tot the 30% aqueous stock solution, xylose or glucose was added to make the final concentrations 0%, 0.25%, 0.5%, 1% and 3%. Each of the aqueous solutions was heat treated at 90° C. for 2 hours.

The results are shown in FIG. 4. It is shown from the result that, under an acidic condition, Cys is efficiently prepared in case the xylose concentration is 1% or less.

Experimental Example 6

Condition for concentration of yeast extract (concentration of dissolved oxygen)

A aqueous solution (pH 4.5) was prepared containing 3.4% final concentration of the yeast extract powder containing γ-GC prepared in Experimental Example 3 and heated at 50° C. for 10 hours. Residual rate of γ-GC (including the resulting Cys) was monitored by oxygen concentration dissolved in the aqueous solution.

The results are shown in FIG. 5. These results show that when the concentration of dissolved oxygen was 1 ppm (controlled by deaeration and introduction of nitrogen), 90% γ-GC content remained; however, when concentration of dissolved oxygen was 6 ppm, the γ-GC decreased to about 40%. Since 6 ppm is a concentration of dissolved oxygen under ordinary pressure, the efficiency of a low-temperature heating in an vacuum condition was shown also in such a view that no SH of an oxide type is produced.

Subsequently, the yeast cell extract prepared in Experimental Example 3(c) (the content separated from the yeast cell residue by means of centrifugal separation) is heated in vacuo (120 mmHg) within the range of 50 to 70° C. until the solid concentration reached 60%. During the concentration, amounts of γ-GC and cysteine contained in the yeast cell extract were periodically measured. As a result, the total amount of γ-GC and cysteine remained in not less than 85%.

Experimental Example 7

Difference in decomposition reaction of γ-GC depending on solid concentrations

The yeast cell extract prepared in Experimental Example 3(c) (solid concentration: 1.7%) was concentrated in vacuo (120 mmHg) at a temperature of 50° C. until solid concentration of 2 to 60% (i.e., 3%, 5%, 8%, 10%, 20% and 30%) was achieved. The pH of each of the aqueous solutions was adjusted to 4.5 by addition of hydrochloric acid and the solutions were heated at 50° C., 60° C., 70° C., 80° C. and 90° C. and the content of γ-GC in the aqueous solution was periodically measured whereupon the decomposition reaction of γ-GC at each concentration was kinetically analyzed.

The results are shown in FIGS. 6A to 6F (see below). In each of the figures, (a) shows changes in the decomposition of γ-GC with a lapse of time at a certain solid concentration and (b) shows the corresponding Arrhenius plots. From these results, it was determined that, when heat treatment was performed at a solid concentration of at least 10%, the decomposition reaction of γ-GC proceeded in a manner that the intramolecular reaction preferentially occurred prior to intermolecular reaction and the reaction proceeded as a temperature-dependent first-order reaction. Accordingly, it was determined that, in a food material containing SH of an oxide type, heating treatment at the concentration of not lower than 10% is effective in suppressing the intermolecular reaction and in proceeding the intramolecular reaction to enhance the productivity of Cys.

Experimental Example 8

Productivity of Cys from γ-GC

The yeast cell extract prepared in Experimental Example 3(c) (solid concentration: 1.7%) was concentrated in vacuo (120 mmHg) at a temperature of 50° C. until a solid concentration of 10 to 60% (10%, 20%, 30%, 40%, 50% and 60%) was achieved. The pH was then adjusted to a pH 4.5 by addition of hydrochloric acid thereto. Each of the aqueous solutions was heated at 90° C. and productivity of Cys was periodically measured. The result was that the productivity of Cys in each solid concentration (quotient of the maximum molar number of Cys contained in an aqueous solution after heating divided by molar numbers of γ-GC contained in a solution before concentration) was in the order of 72.5%, 77.6%, 78.7%, 78.1%, 77.5% and 74%.

Experimental Example 9

Productivity of Cys from γ-GC

The yeast cell extract prepared in Experimental Example 3 (c)(solid concentration: 1.7%) was concentrated in vacuo (120 mmHg) at a temperature of 50° C. until a solid concentration of 10 to 60% (10%, 20%, 30%, 40%, 50%, and 60%) was achieved. Subsequently, the pH was adjusted to pH 3.5 by addition of hydrochloric acid thereto or adjusted to pH 6.0 by addition of sodium hydroxide. Each of the aqueous solutions was heated at 90° C. and productivity of Cys was periodically measured. The result was that the productivity of Cys at pH 3.5 in each solid concentration was in the order of 75.8%, 79.3%, 80.2%, 80.1%, 76.2%, and 75.2%. And the result was that the productivity of Cys at pH 6.0 in each solid concentration was in the order of 71.8%, 72.8%, 75.8%, 76.3%, 74.2%, and 72.2%.

Experimental Example 10

Experimental example using AJ14861 strain (a) Preparation of γ-GC containing yeast cells.

AJ14861 strain was inoculated in YPD medium and cultured with shaking at 30° C. The resulting culture was inoculated in a medium A, which contains 0.4 mg/dl of calcium pantothenate, and cultured with shaking at 30° C. At their logarithmic growth phases, the cells were collected and inoculated in a medium B, which did not contain calcium pantothenate, at the concentration of 120 mg (dried yeast weight)/dl (medium) and cultured with shaking at 30° C. for 1 day. (The γ-GC content per dried yeast cells was increasing in time course and became about 4% at 24 hours.) The cultured product was collected and washed to prepare the γ-GC containing yeast cells.

The medium B, can be exemplified as follows.

| Composition | Concentration |
| --- | --- |
| Glucose | 3 g/dl |
| $KH_2PO_4$ | 0.15 g/dl |
| $MgSO_4.7H_2O$ | 0.17 g/dl |
| $CaCl_2.2H_2O$ | 0.03 g/dl |
| Urea | 0.4 g/dl |
| Biotin | 1.5 ppm |
| Inositol | 100 ppm |
| V.B6 | 0.05 ppm |
| Zn ion | 0.3 ppm |
| Fe ion | 0.3 ppm |
| Cu ion | 0.05 ppm |

The medium A, which contains calcium pantotenate, is medium B with the addition of 0.4 mg/dl of calcium pantotenate.

(b) Preparation of γ-GC containing yeast extract

The γ-GC containing yeast cells prepared as above were suspended in water until a concentration of 10 g/dl was achieved and heated at 70° C. for 10 minutes to extract the content therefrom. The extract was separated into yeast cell residue and content by centrifugal separation. The separated content (yeast extract; solid concentration: 2.2%) contained γ-GC in an amount of about 14% to a DM.

(c) Productivity of Cys from γ-GC

The yeast cell extract prepared above was concentrated in vacuo (120 mmHg) at a temperature of 50° C. until a solid concentration of 30% was achieved. The pH was then adjusted to pH 4.5 by addition of hydrochloric acid thereto. The aqueous solution was heated at 90° C. and productivity of Cys was periodically measured. The productivity of Cys was 82.1%.

Example 1

Preparation of highly cysteine-containing food material (a) Preparation of Liquid Food Material Containing a High Amount of Cysteine γ-GC-containing yeast cells prepared by the method mentioned in Experimental Example 3 were suspended in water to make 10 g/dl and heated at 70° C. for 10 minutes to extract the content. Centrifugal separation was carried out to separate into yeast cell residue and content. As such, 10 L of the content containing γ-GC were prepared (the solid concentration in the extract was about 1.7% and γ-GC was contained in an amount of about 8% in the solid). The content was concentrated in vacuo (120 mmHg) at a temperature of 50° C. and, after about 10 hours, the solid concentration was made about 30%. The concentrate to which hydrochloric acid was added to adjust to pH 4.5 was maintained at 90° C. for about 1 hour to prepare a liquid food material containing a high amount of cysteine. Accordingly, a food material containing 3.1% of Cys to the solid was prepared. At that time, conversion rate of γ-GC to Cys was about 80%.

(b) Preparation of Powdery Food Material Containing a High Amount of Cysteine

The above-prepared liquid highly cysteine-containing food material was freeze-dried to give a highly Cys-containing food material in a powdery form where the rate to the solid was 3.1%.

ADVANTAGES OF THE INVENTION

According to the present invention, an efficient preparation process of cysteine from γ-GC is provided. In addition, a food material containing a high amount of cysteine is readily produced from a yeast extract.

Numerous modifications and variations on the present invention are possible in light of the above teachings. It is, therefore, to be understood that within the scope of the accompanying claims, the invention may be practiced otherwise than as specifically described herein.

The invention claimed is:

1. A method for the manufacture of a food material containing cysteine, comprising:
    preparing a yeast extract from yeast cells containing γ-glutamylcysteine;
    concentrating the extract at a temperature of not greater than 60° C. to prepare a food material in a liquid form where the solid concentration is at least 10%;
    raising the temperature to a temperature ranging from 70 to 130° C.;
    heat treating the temperature at 70 to 130° C. for a time sufficient to convert the γ-glutamylcysteine into cysteine.

2. The method of claim 1, wherein the amount of reducing sugar in the food material is not more than 1%.

3. The method of claim 2, wherein the amount of reducing sugar in the food material is not more than 0.5%.

4. The method of claim 1, wherein said heat treating is under an acidic condition.

5. The method of claim 4, wherein said acidic condition is at a pH ranging from 3.5 to 6.0.

6. The method of claim 1, wherein said concentrating is by vacuum concentration.

7. The method of claim 1, wherein said heat treating is at a temperature of 70 to 100° C.

8. The method of claim 1, wherein said heat treating is at a temperature of 75 to 100° C.

9. The method of claim 1, wherein γ-glutamylcysteine is present in the yeast extract at an amount not to exceed 30% by weight of the total yeast extract.

10. The method of claim 1, wherein γ-glutamylcysteine is present in the yeast extract at an amount of at least 1% by weight of the total yeast extract.

11. The method of claim 1, wherein said concentrating is for a time ranging from 6 to 15 hours.

12. The method of claim 1, wherein said heat treating is for a time ranging from 30 to 120 minutes.

13. The method of claim 1, wherein said yeast extract contains no more than 0.5% by weight of glutathione.

14. The method of claim 1, wherein said yeast extract contains no more than 0.1% by weight of glutathione.

15. The method of claim 1, wherein solid concentration obtained by said concentrating is at least 20%.

16. The method of claim 1, wherein solid concentration obtained by said concentrating is at least 30%.

17. The method of claim 1, wherein solid concentration obtained by said concentrating ranges from 10 to 60%.

* * * * *